US010487725B2

(12) United States Patent
Takahashi et al.

(10) Patent No.: US 10,487,725 B2
(45) **Date of Patent: *Nov. 26, 2019**

(54) VARIABLE FLOW VALVE MECHANISM AND TURBOCHARGER

(71) Applicant: IHI Corporation, Koto-ku (JP)

(72) Inventors: Yukio Takahashi, Tokyo (JP); Shinichi Kaneda, Tokyo (JP); Yutaka Uneura, Tokyo (JP)

(73) Assignee: IHI Corporation, Koto-ku (JP)

( * ) Notice: Subject to any disclaimer, the term of this patent is extended or adjusted under 35 U.S.C. 154(b) by 191 days.

This patent is subject to a terminal disclaimer.

(21) Appl. No.: 15/423,132

(22) Filed: Feb. 2, 2017

(65) Prior Publication Data

US 2017/0145911 A1 May 25, 2017

Related U.S. Application Data

(63) Continuation of application No. PCT/JP2015/072777, filed on Aug. 11, 2015.

(30) Foreign Application Priority Data

Aug. 29, 2014 (JP) ................................ 2014-176196

(51) Int. Cl.
*F02B 37/18* (2006.01)

(52) U.S. Cl.
CPC .......... *F02B 37/186* (2013.01); *Y02T 10/144* (2013.01)

(58) Field of Classification Search
CPC ...... F02B 37/18; F02B 37/186; F02B 37/183; Y02T 10/144
USPC .......................................................... 60/602
See application file for complete search history.

(56) References Cited

U.S. PATENT DOCUMENTS

| | | | | |
|---|---|---|---|---|
| 7,329,090 | B2 | 2/2008 | Schlienger et al. | |
| 9,243,549 | B2 | 1/2016 | Hinkelmann et al. | |
| 9,464,565 | B2 * | 10/2016 | Yamaguchi | F02B 37/186 |
| 9,593,624 | B2 * | 3/2017 | Segawa | F02B 37/186 |

(Continued)

FOREIGN PATENT DOCUMENTS

| | | |
|---|---|---|
| CN | 1752417 A | 3/2006 |
| CN | 103201480 A | 7/2013 |

(Continued)

OTHER PUBLICATIONS

Japanese Office Action dated Nov. 28, 2017 in Patent Application No. 2016-545427, 2 pages.

(Continued)

*Primary Examiner* — Thai Ba Trieu
(74) *Attorney, Agent, or Firm* — Oblon, McClelland, Maier & Neustadt, L.L.P.

(57) ABSTRACT

An actuating rod of an actuator is rotatably connected to a distal end portion of a link member, a connecting pin is integrally provided at a distal end portion of the actuator rod, a pin hole for allowing insertion of the connecting pin is penetrated and formed at a distal end portion of the link member, and a disc spring for biasing the distal end portion of the link member and the distal end portion of the actuating rod in an axial direction (both sides of the axial direction) of the actuating rod as directions opposite to each other between the distal end portion of the link member and the distal end portion of the actuator rod.

16 Claims, 13 Drawing Sheets

(56) References Cited

U.S. PATENT DOCUMENTS

| | | | | |
|---|---|---|---|---|
| 9,631,628 | B2 * | 4/2017 | Takahashi | F02B 37/183 |
| 2006/0073020 | A1 | 4/2006 | Schlienger et al. | |
| 2009/0028694 | A1 | 1/2009 | Naemura et al. | |
| 2009/0293654 | A1 | 12/2009 | Pintauro | |
| 2011/0126537 | A1 | 6/2011 | Yoshimoto et al. | |
| 2011/0135449 | A1 * | 6/2011 | Parker | F01D 17/165 415/121.2 |
| 2012/0055154 | A1 * | 3/2012 | Ebert | F02B 37/186 60/602 |
| 2012/0317975 | A1 | 12/2012 | Schoenherr et al. | |
| 2013/0139502 | A1 * | 6/2013 | Chu | F02B 37/186 60/602 |
| 2013/0333379 | A1 | 12/2013 | Hinkelmann et al. | |
| 2014/0140831 | A1 | 5/2014 | Tschirschke | |
| 2014/0290242 | A1 * | 10/2014 | Isogai | F02B 37/186 60/605.1 |
| 2015/0097345 | A1 * | 4/2015 | House | F16J 15/186 277/585 |
| 2018/0223727 | A1 * | 8/2018 | Nakajima | F02B 37/186 |

FOREIGN PATENT DOCUMENTS

| | | | | |
|---|---|---|---|---|
| DE | 102010043147 | A1 * | 10/2011 | F02B 37/186 |
| DE | 102011079573 | A1 * | 1/2013 | F02B 37/186 |
| DE | 102012216893 | A1 * | 4/2014 | F02B 37/186 |
| JP | 2005226591 | A * | 8/2005 | F02B 37/186 |
| JP | 2006-90311 | | 4/2006 | |
| JP | 2008-101589 | | 5/2008 | |
| JP | 2009-236088 | | 10/2009 | |
| JP | 2010-90772 | A | 4/2010 | |
| JP | 2011-523992 | | 8/2011 | |
| JP | 2013-130133 | | 7/2013 | |
| JP | WO 2013098884 | A1 * | 7/2013 | F02B 37/186 |
| JP | WO 2013115206 | A1 * | 8/2013 | F02B 37/186 |
| JP | WO 2013133376 | A1 * | 9/2013 | F02B 37/186 |
| JP | 2014-521865 | | 8/2014 | |

OTHER PUBLICATIONS

Chinese Office Action dated Jul. 18, 2018 in Patent Application No. 201580045446.9, 5 pages.
International Search Report dated Oct. 27, 2015 in PCT/JP2015/072777, filed on Aug. 11, 2015 (with English Translation).
Written Opinion dated Oct. 27, 2015 in PCT/JP2015/072777, filed on Aug. 11, 2015.

* cited by examiner

VARIABLE FLOW VALVE MECHANISM AND TURBOCHARGER

CROSS REFERENCE TO RELATED APPLICATIONS

This application is a continuation application of International Application No. PCT/JP2015/072777, filed on Aug. 11, 2015, which claims priority to Japanese Patent Application No. 2014-176196, filed on Aug. 29, 2014, the entire contents of which are incorporated by reference herein.

BACKGROUND

1. Technical Field

The present disclosure relates to a variable flow valve mechanism for opening and closing an opening portion of a variable gas flow passage for adjusting a flow rate of an exhaust gas supplied to a turbine wheel side in a turbocharger such as a turbocharger for a vehicle and a turbocharger.

2. Description of the Related Art

As a measure for suppressing an excessive rise of a turbocharging pressure by a turbocharger for a vehicle, a bypass passage is usually formed inside a turbine housing in the turbocharger for a vehicle. A part of an exhaust gas flows through this bypass passage and bypasses the turbine wheel. Furthermore, a waste gate valve for opening and closing an opening portion of the bypass passage is provided at an appropriate position of the turbine housing. Here, the bypass passage is one of a variable gas flow passage for adjusting a flow rate of the exhaust gas supplied to the turbine wheel side, and the waste gate valve is one of a variable flow valve mechanism for opening and closing an opening portion of the variable gas flow passage.

The waste gate valve includes a stem (rotating shaft) rotatably supported by the turbine housing, a valve capable of abutting on and being separated from a valve seat on the opening portion side in the bypass passage, and a mounting member for connecting the stem with the valve. The stem is rotatably supported to a forward direction and to a backward direction in a support hole penetrated and formed in an outer wall of the turbine housing. A base end portion (one end portion) of the stem protrudes outside the turbine housing. Furthermore, a base end portion of the mounting member is integrally connected to a distal end portion of the stem. A valve is provided at a distal end portion of the mounting member. The valve is capable of abutting on and being separated from the valve seat on the opening portion side in the bypass passage. Moreover, a base end portion (one end portion) of a link member is integrally connected to the base end portion of the stem. When the link member swings in the forward direction or in the backward direction around a shaft center of the stem, the valve swings in the forward direction or in the backward direction (in an opening direction or in a closing direction) via the stem and the mounting member.

An actuator is disposed on an outer wall of a compressor housing in the turbocharger for a vehicle. The actuator swings the link member around a shaft center of the stem. In addition, the actuator includes an actuating rod movable in an axial direction thereof (an axial direction of the actuating rod, in other words, an axial direction of the actuator). A distal end portion of the actuating rod is rotatably connected to a distal end portion (the other end portion) of the link member. When the turbocharging pressure reaches a set pressure, the drive of the actuator makes the actuating rod move to one side of the axial direction thereof (the axial direction of the actuating rod) to thereby swing the link member in the forward direction. When the turbocharging pressure becomes less than the set pressure after the opening portion of the bypass passage is opened, the drive of the actuator makes the actuating rod move to the other side in the axial direction thereof to thereby swing the link member in the backward direction.

Note that a technology relating to the present disclosure is shown in Japanese Patent Application Laid-Open Publication Nos. 2009-236088 and 2008-101589.

SUMMARY

Incidentally, when pulsation (pulsation pressure) of an exhaust gas from an engine side or pulsation from an actuator side or the like occurs during an operation of a turbocharger for a vehicle, not only a valve but also a link member and the actuating rod in a conjunction relation with the valve vibrate. In such a case, it is concerned that a chattering sound (contact sound by vibration) from the waste gate valve occurs and incurs decrease of quietness of a waste gate valve.

Note that the aforementioned problem is similarly generated also in a variable flow valve mechanism other than the waste gate valve.

Therefore, the present disclosure has an object to provide a variable flow valve mechanism which can solve the aforementioned problem and a turbocharger.

A first aspect of the present disclosure is a variable flow valve mechanism that is used in a turbocharger including a variable gas flow passage inside a turbine housing or a connecting body connected and communicated with the turbine housing, the variable gas flow passage being for adjusting a flow rate of an exhaust gas supplied to a turbine wheel side, the mechanism configured to open and close an opening portion of the variable gas flow passage and including: a stem supported by an outer wall of the turbine housing or the connecting body; a mounting member having a base end portion integrally connected to the stem; a valve provided at a distal end portion of the mounting member and configured to open and close the opening portion of the variable gas flow passage; a link member having a base end portion integrally connected to a base end portion of the stem; an actuating rod having a distal end portion rotatably connected to a distal end portion of the link member and configured to swing the link member around a shaft center of the stem in a forward direction and a backward direction; a pin hole formed at a distal end portion of the link member or a distal end portion of the actuating rod; a connecting pin provided at the distal end portion of the actuating rod or the distal end portion of the link member and inserted into the pin hole; and a biasing member configured to bias the distal end portion of the link member and the distal end portions of the actuating rod in directions opposite to each other.

Here, in the description and claims of the present application, a "turbocharger" has a meaning including not only of a turbocharger with a single stage but also a turbocharger with a multiple stages (low-pressure stage and high-pressure stage). In addition, a "connecting body connected in a state of communicating with the turbine housing," has a meaning including a pipeline, a manifold, a casing and the like which are connected in a state communicating with a gas inlet or a gas outlet of the turbine housing. Furthermore, a "variable gas flow passage" has a meaning including a bypass passage and the like for causing a part of the exhaust gas to bypass the turbine wheel, and a "variable flow valve mechanism" has a meaning including the waste gate valve or the like for opening and closing an opening portion of the bypass passage. Additionally, the term "provided" has a meaning including being indirectly provided via another member besides being directly provided. The term "supported" has a meaning including being supported indirectly through another member besides being supported directly. The term "connected" has a meaning including being indirectly connected via another member besides being directly connected. Moreover, an "biasing member" has a meaning including: a spring member such as a disc spring, a wave washer, and a coil spring; a rubber member made of heat-resistant rubber; a damping alloy member made of a damping alloy; and the like.

A second aspect of the present disclosure is a turbocharger for turbocharging air supplied to an engine by using energy of the exhaust gas from the engine and the turbocharger includes the variable flow valve mechanism according to the first aspect According to the present disclosure, vibration of the link member, the actuating rod and the like caused by pulsation or the like of the exhaust gas from the engine side can be suppressed. Therefore, a chattering sound from the variable flow valve mechanism can be reduced, and quietness of the variable flow valve mechanism can be enhanced.

BRIEF DESCRIPTION OF THE DRAWINGS

FIG. 3 also illustrates a link member.

DESCRIPTION OF THE EMBODIMENTS

Figure 1:
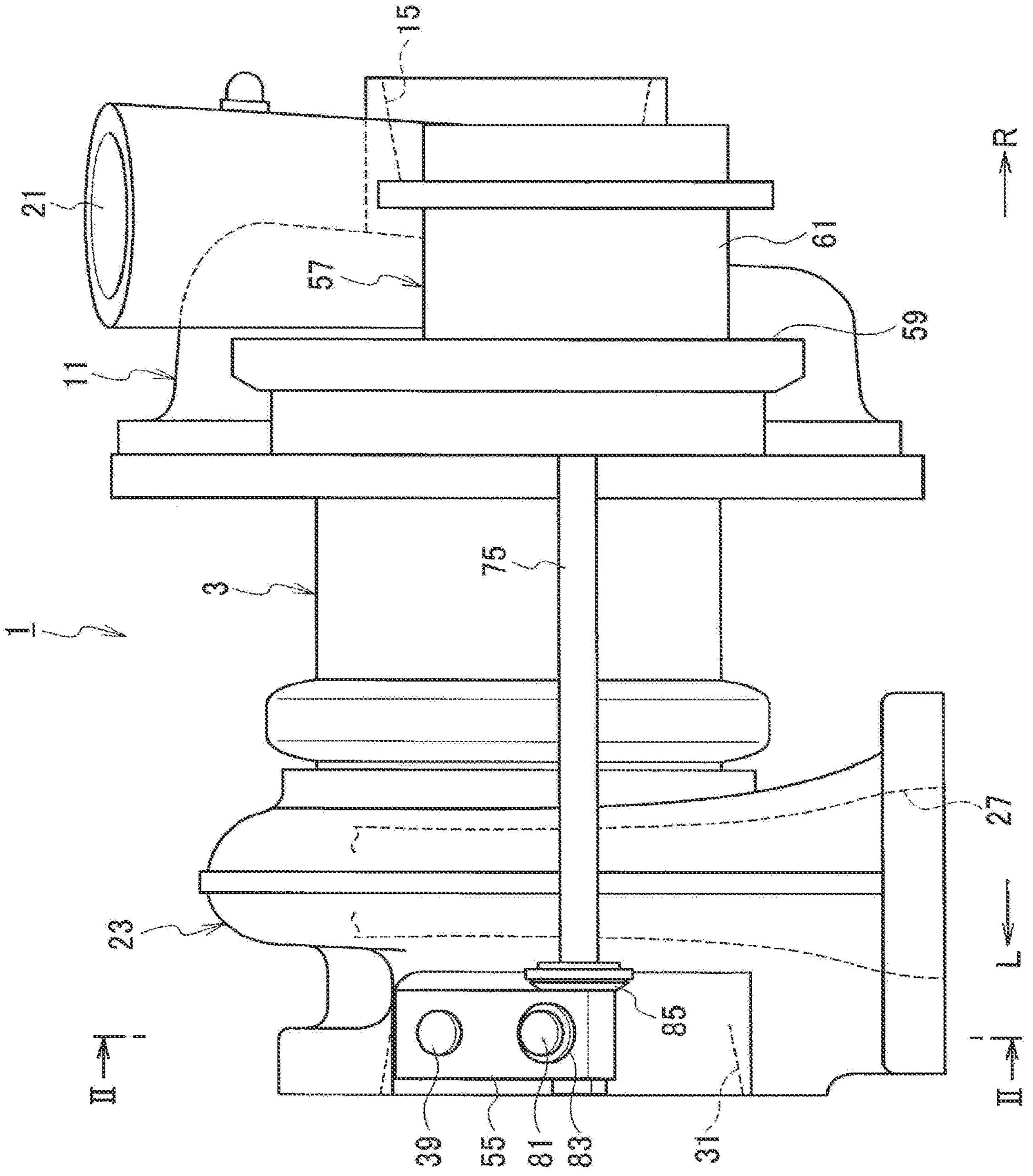
FIG. 1 is a front view of a turbocharger according to an embodiment of the present disclosure.

An embodiment of the present disclosure will be described by referring to FIG. 1 to FIG. 13. Note that reference character "L" in the figure denotes a left direction and "R" denotes a right direction.

Figure 13:
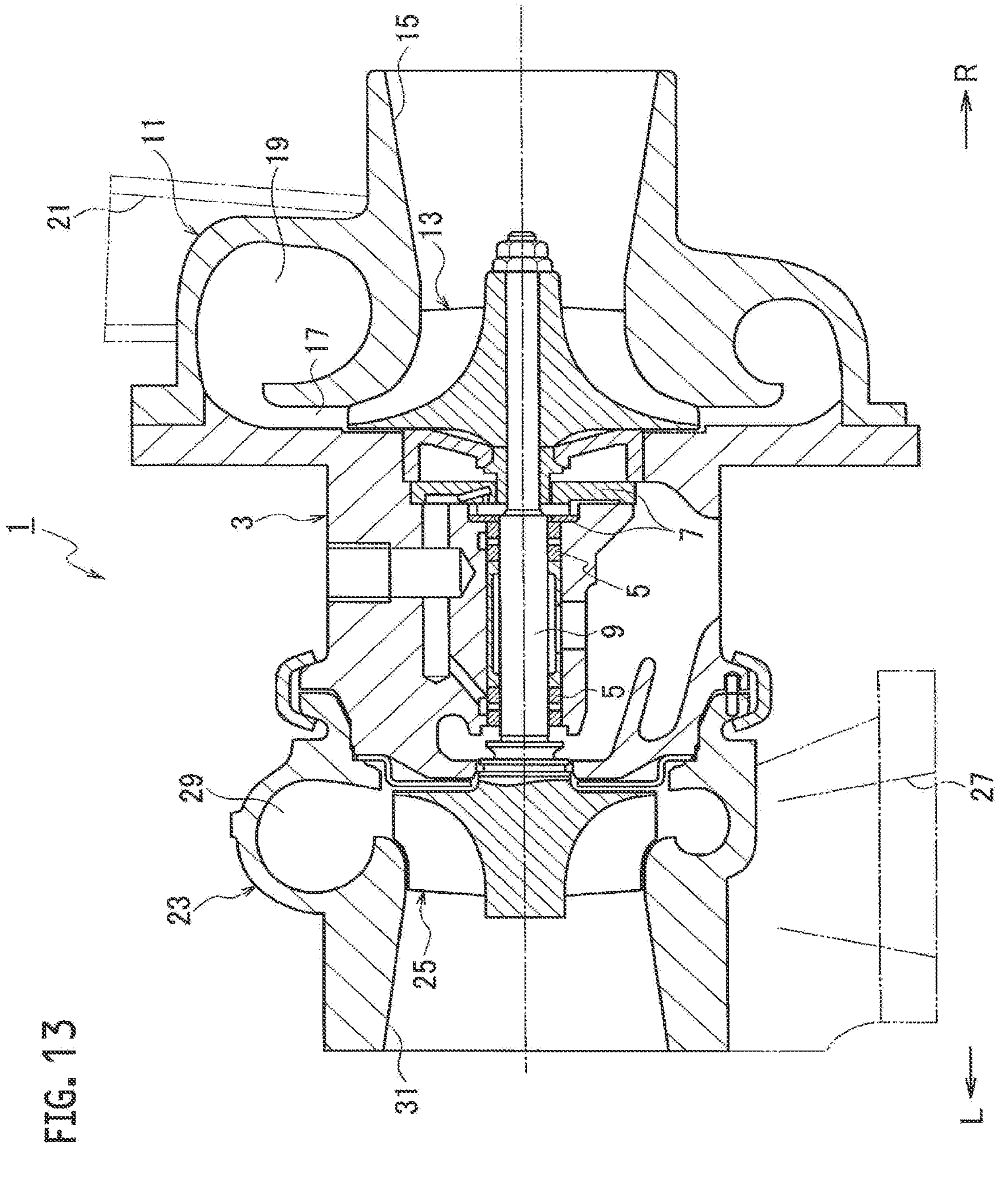
FIG. 13 is a front cross-sectional view of the turbocharger according to the embodiment of the present disclosure.

A turbocharger 1 according to the embodiment of the present disclosure is for a vehicle, for example. As illustrated in FIG. 1 and FIG. 13, the turbocharger 1 turbocharges (compresses) air to be supplied to an engine by utilizing energy of an exhaust gas from an engine (not shown).

As illustrated in FIG. 13, the turbocharger 1 includes a bearing housing 3. A pair of radial bearings 5 and 5 and a pair of thrust bearings 7 and 7 are provided in the bearing housing 3. These bearings rotatably support a rotor shaft (turbine shaft) 9 extending in a right-and-left direction. In other words, the rotor shaft 9 is rotatably provided via the plurality of bearings 5 and 7 in the bearing housing 3.

A compressor housing 11 is provided on the right side of the bearing housing 3. A compressor wheel 13 is rotatably provided in the compressor housing 11. The compressor wheel 13 is integrally connected concentrically on a right end portion of the rotor shaft 9 and compresses air by utilizing a centrifugal force.

An air inlet (air inlet passage) 15 for introducing air is formed on an inlet side (upstream side in a main stream direction of air) of the compressor wheel 13 in the compressor housing 11. The air inlet 15 is connected to an air cleaner (not shown) for purifying air. Furthermore, a diffuser channel 17 is provided on an outlet side (downstream side in the main stream direction of the air) of the compressor wheel 13 between the bearing housing and the compressor housing 11. The diffuser channel 17 is annularly formed and boosts the pressure of the compressed air. Moreover, a compressor scroll channel 19 is provided in the compressor housing 11. The compressor scroll channel 19 is formed in a spiral state so as to surround the compressor wheel 13 and communicates with the diffuser channel 17. An air outlet (air outlet passage) 21 is formed for discharging the compressed air, at an appropriate position on the outer wall of the compressor housing 11. The air outlet 21 communicates with the compressor scroll channel 19 and is connected to an air feed manifold (not shown) of the engine.

A turbine housing 23 is provided on the left side of the bearing housing 3. In addition, a turbine wheel 25 is rotatably provided in the turbine housing 23. The turbine wheel 25 is integrally connected concentrically on a left end portion of the rotor shaft 9 and generates a rotary force (rotary torque) by using pressure energy of the exhaust gas.

Figure 2:
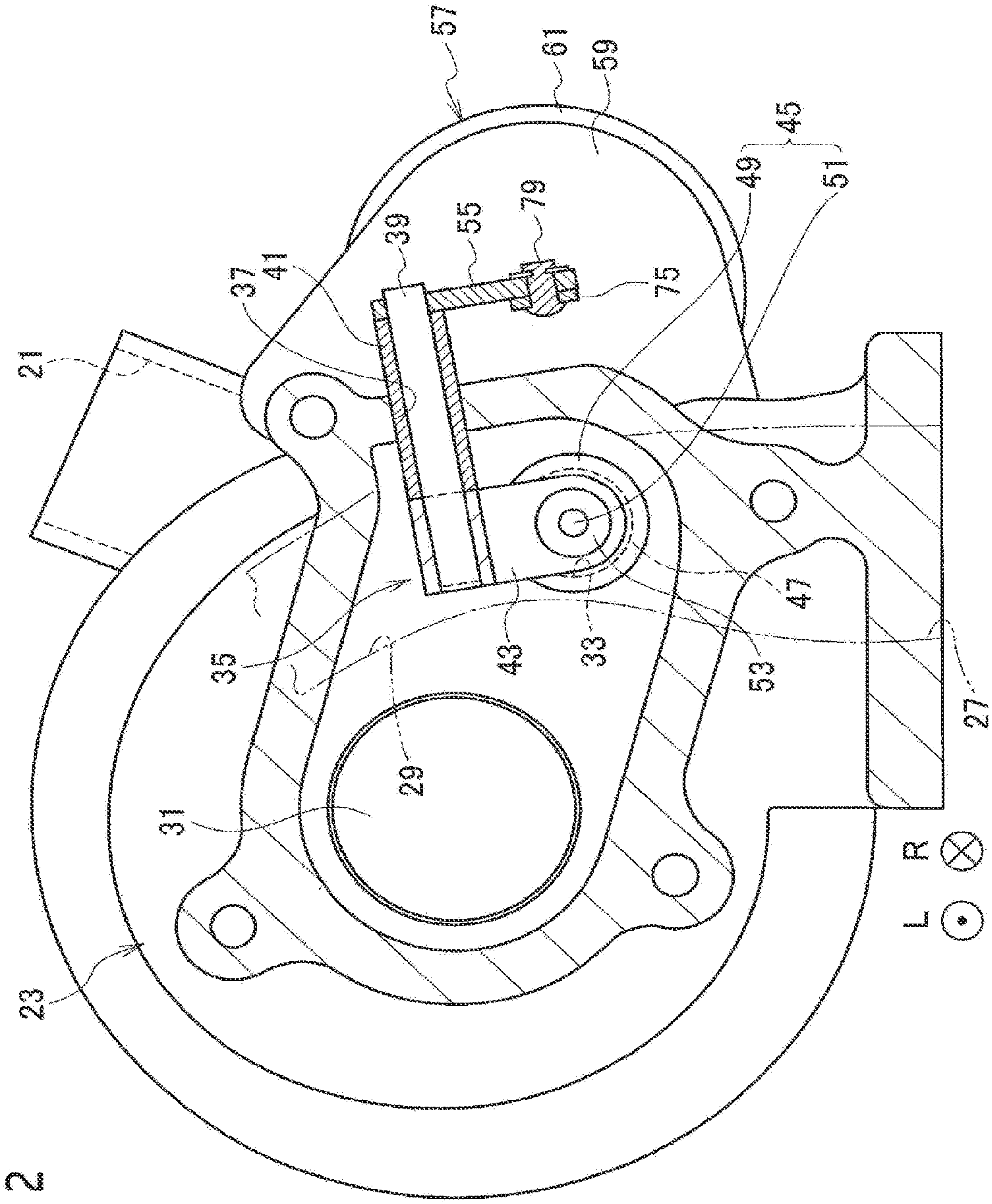
FIG. 2 is a cross-sectional view along II-II line in FIG. 1.

As illustrated in FIG. 1, FIG. 2, and FIG. 13, a gas inlet (gas inlet passage) 27 for introducing the exhaust gas is formed at an appropriate position on the outer wall of the turbine housing 23. The gas inlet 27 is connected to an exhaust manifold (not shown) of the engine. Furthermore, a turbine scroll channel 29 is formed in a spiral state on an inlet side (upstream side in the mainstream direction of the exhaust gas) of the turbine wheel 25 in the turbine housing 23. In addition, a gas outlet (gas outlet passage) 31 for discharging the exhaust gas is formed on an outlet side (downstream side in the main stream direction of the exhaust gas) of the turbine wheel 25 in the turbine housing 23. The gas outlet 31 is connected to a purifying device (not shown) of the exhaust gas using a catalyst via a connection pipe (not shown) or the like.

As illustrated in FIG. 1 and FIG. 2, a bypass passage 33 is formed inside the turbine housing 23. A part of the exhaust gas introduced through the gas inlet 27 flows through the bypass passage 33 and is led out to the gas outlet 31 side. That is, the part of the exhaust gas bypasses the turbine wheel 25 by the bypass passage 33. The bypass passage 33 is a so-called variable gas flow passage for adjusting a flow rate of the exhaust gas supplied to the turbine wheel 25 side and has configuration similar to the known bypass passage disclosed in, for example, Japanese Patent Application Laid-Open Publication No. 2013-185552.

A waste gate valve 35 is provided at an appropriate position of the turbine housing 23. The waste gate valve 35 is constituted so as to open and close an opening portion of the bypass passage 33. That is, the waste gate valve 35 is a so-called variable flow valve mechanism.

The waste gate valve 35 includes a stem (rotating shaft) 39 rotatably supported by the turbine housing 23, a valve 45 for opening and closing the opening portion (valve seat 47) of the bypass passage 33, and a mounting member 43 for connecting the stem 39 with the valve 45. The stem 39 is provided, in a support hole 37 penetrated and formed in an outer wall of the turbine housing 23, rotatably in a forward direction and a backward direction via a bush 41. A base end portion (one end portion, first end portion) of the stem 39 protrudes outside the turbine housing 23. Furthermore, a base end portion of the mounting member 43 is integrally connected to a distal end portion (the other end portion, second end portion) of the stem 39. A mounting hole (not shown) having a shape with width across flats or having a circular shape is formed at a distal end portion of the mounting member 43 so as to penetrate the distal end portion. Note that a base end portion of the mounting member 43 is integrally connected to the distal end portion of the stem 39 by, for example, fillet welding, TIG welding, laser beam welding, swaging, or the like.

The valve 45 is fitted into the mounting hole of the mounting member 43. In this fitting, the valve 45 is allowed to have play (including tilting and slight movement) with respect to the mounting member 43. Furthermore, the valve 45 includes a valve body 49 capable of abutting on and being separated from the valve seat 47 on the opening portion side of the bypass passage 33, and a valve shaft 51 integrally formed at a center part of the valve body 49 and fitted into the mounting hole of the mounting member 43. As described above, since the play (chattering) of the valve 45 with respect to the mounting member 43 is allowed, adhesiveness of the valve body 49 to the valve seat 47 is assured. Moreover, an annular hook (washer) 53 is integrally provided at a distal end portion of the valve shaft 51. The hook (washer) 53 prevents removal of the valve 45 from the mounting member 43. Note that the hook 53 is integrally provided at the distal end portion of the valve shaft 51 by, for example, fillet welding, TIG welding, laser beam welding, swaging or the like.

Here, instead of integral formation of the valve shaft 51 at the center part of the valve body 49 and integral provision of the hook 53 at the distal end portion of the valve shaft 51, the valve shaft 51 may be integrally provided at the center part of the valve body 49 and the hook 53 may be integrally formed at the distal end portion of the valve shaft 51. Note that the valve shaft 51 is integrally provided at the center part of the valve body 49 by, for example, swaging, fillet welding, TIG welding or laser beam welding.

The base end portion (one end portion) of the link member (link plate) 55 is integrally connected to the base end portion of the stem 39. Here, the valve 45 swings in the forward direction and the backward direction (opening direction and closing direction) via the stem 39 and the mounting member 43, by causing the link member 55 to swing in forward and backward directions around the shaft center of the stem 39. Note that the base end portion of the link member 55 is integrally connected to the base end portion of the stem 39 by, for example, fillet welding, TIG welding, laser beam welding, swaging or the like.

As illustrated in FIG. 1 to FIG. 4A and FIG. 4B, an actuator 57 is provided on the outer wall of the compressor housing 11 via a bracket 59. The actuator 57 is, for example, a diaphragm actuator as below, and swings the link member 55 around the shaft center of the stem 39 in the forward direction and the backward direction. The actuator 57 includes a cylindrical actuator body 61. Moreover, a diaphragm 63 is provided in the actuator body 61 so as to be divided into a pressure chamber 65 and an atmospheric air chamber 67. The pressure chamber 65 is a chamber (space) to which a positive pressure from the air outlet 21 as a pressure source is applied. The atmospheric air chamber 67 is a chamber communicating with atmospheric air. A first retainer plate 69 is provided on a surface on the pressure chamber 65 side in the diaphragm 63. In addition, a second retainer plate 71 is provided on a surface on the atmospheric air chamber 67 side in the diaphragm 63. Furthermore, a return spring (coil spring) 73 is provided in the atmospheric air chamber 67. The return spring 73 biases the diaphragm 63 to the pressure chamber 65 side.

In the actuator body 61, an actuating rod 75 is provided via a bush 77. The actuating rod 75 protrudes outside from the actuator body 61 and is movable in its axial direction. Moreover, a base end portion of the actuating rod 75 is integrally connected to a center part of the diaphragm 63. A distal end portion of the actuating rod 75 has a flat plate shape and is rotatably (swingably) connected to a distal end portion of the link member 55. In addition, in order to rotatably connect the distal end portion of the actuating rod 75 and the distal end portion of the link member 55 to each other, a connecting pin 79 having a circular cross-section is integrally provided at the distal end portion of the actuating rod 75. Additionally, a circular pin hole 81 for allowing insertion (fitting) of the connecting pin 79 is penetrated and formed at the distal end portion of the link member 55. Furthermore, the connecting pin 79 is provided with a retainer ring 83 for preventing removal of the link member 55 from the actuating rod 75. Note that the connecting pin 79 is integrally provided at the distal end portion of the actuating rod 75 by, for example, swaging, fillet welding, TIG welding or laser beam welding. A cross-sectional shape of the connecting pin 79 and a shape of the pin hole 81 in this embodiment are circular. However, these shapes may be changed to an arbitrary shape such as a square as long as the connecting pin 79 is relatively rotatable with respect to the pin hole 81.

A disc spring 85 is provided between the distal end portion of the link member 55 and the distal end portion of the actuating rod 75, as a biasing member (first biasing member) for biasing the distal end portion of the link member 55 and the distal end portion of the actuating rod 75 in directions opposite to each other, in the axial direction of the actuating rod 75. That is, the disc spring 85 biases the both distal end portions so that the distal end portion of the link member 55 and the distal end portion of the actuating rod 75 are separated away from each other in the axial direction of the actuating rod 75. The disc spring 85 is made of a heat-resistant metal such as a Ni-based alloy, Ni—Co alloy, or stainless steel. The distal end portion of the actuating rod 75 is inserted inside the disc spring 85. Furthermore, a washer 87 is provided at the distal end portion of the actuating rod 75 via a retainer ring 89. The washer 87 supports (holds) one end portion (right end portion) of the disc spring 85. An inner circumferential surface of the pin hole 81 of the link member 55 is locally brought into pressure contact with an outer circumferential surface of the connecting pin 79, by a biasing force (elastic force) of the disc spring 85. Note that the term pressure contact means making contact while being pressed. Meanwhile, the biasing direction of the disc spring 85 coincides with the axial direction of the actuating rod 75. Within a range in which the effect of the present disclosure can be exerted, this biasing direction may be inclined with respect to the axial direction of the actuating rod 75. Furthermore, another washer supporting the other end portion (left end portion) of the disc spring 85 may be provided at the distal end portion of the actuating rod 75.

Then, a configuration for connecting the distal end portion of the actuating rod 75 and the distal end portion of the link member 55 to each other and a configuration of the biasing member can be changed as follows.

Figure 5A:
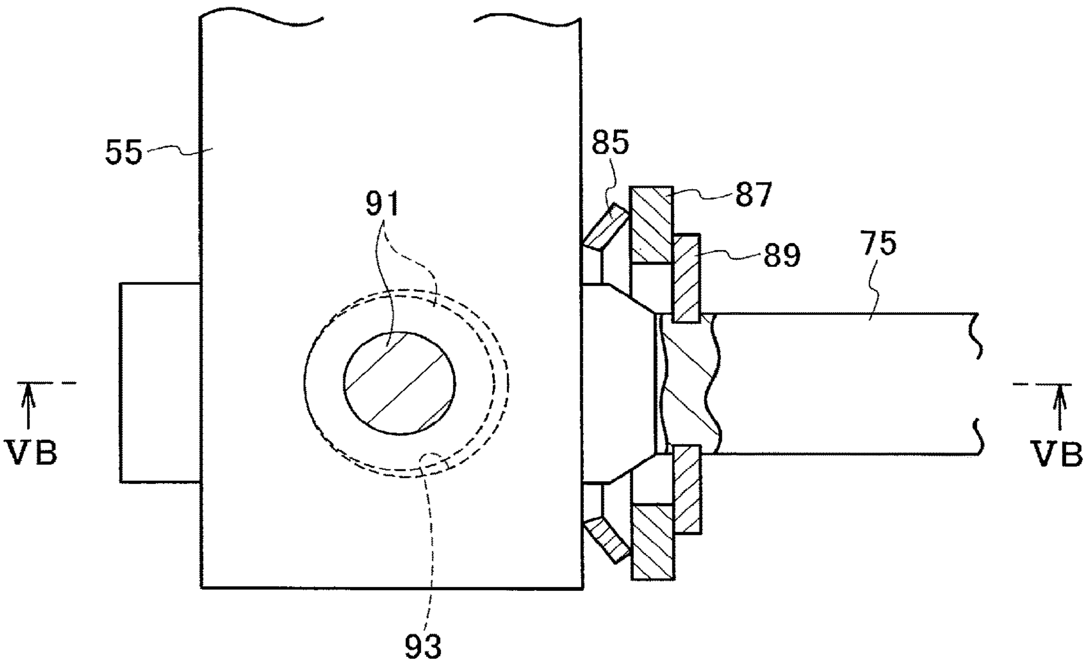
FIG. 5A is a diagram illustrating another state where the disc spring is provided between the distal end portion of the link member and the distal end portion of an actuating rod.
Figure 5B:
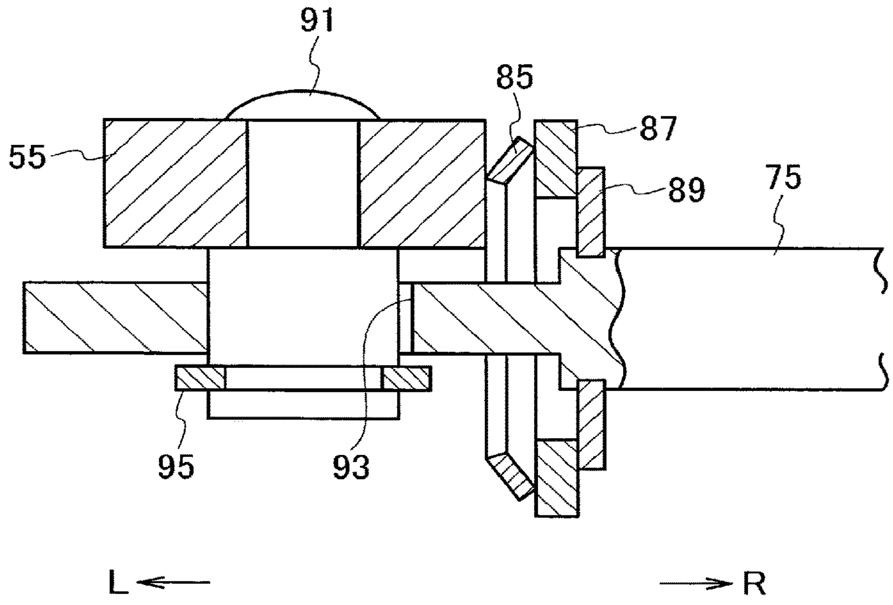
FIG. 5B is a cross-sectional view along VB-VB line in FIG. 5A.

As illustrated in FIG. 5A and FIG. 5B, a connecting pin 91 is integrally provided at the distal end portion of the link member 55 by swaging or the like, and a pin hole 93 for allowing insertion (fitting) of the connecting pin 91 may be penetrated and formed at the distal end portion of the actuating rod 75. In this case, a retainer ring 95 is provided in the connecting pin 91 to thereby prevent removal of the actuating rod 75 from the link member 55. Therefore, an inner circumferential surface of the pin hole 93 of the actuating rod 75 is locally brought into pressure contact with the outer circumferential surface of the connecting pin 91, by the biasing force (elastic force) of the disc spring 85.

Figure 6A:
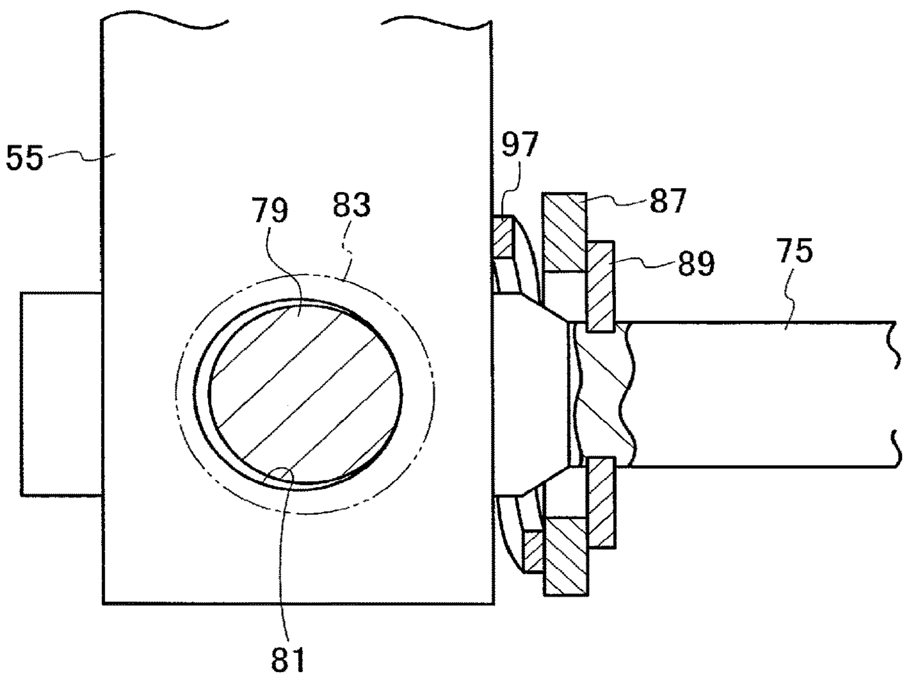
FIG. 6A is a cross-sectional view illustrating a state where a wave washer is provided between the distal end portion of the link member and the distal end portion of the actuating rod.
Figure 6B:
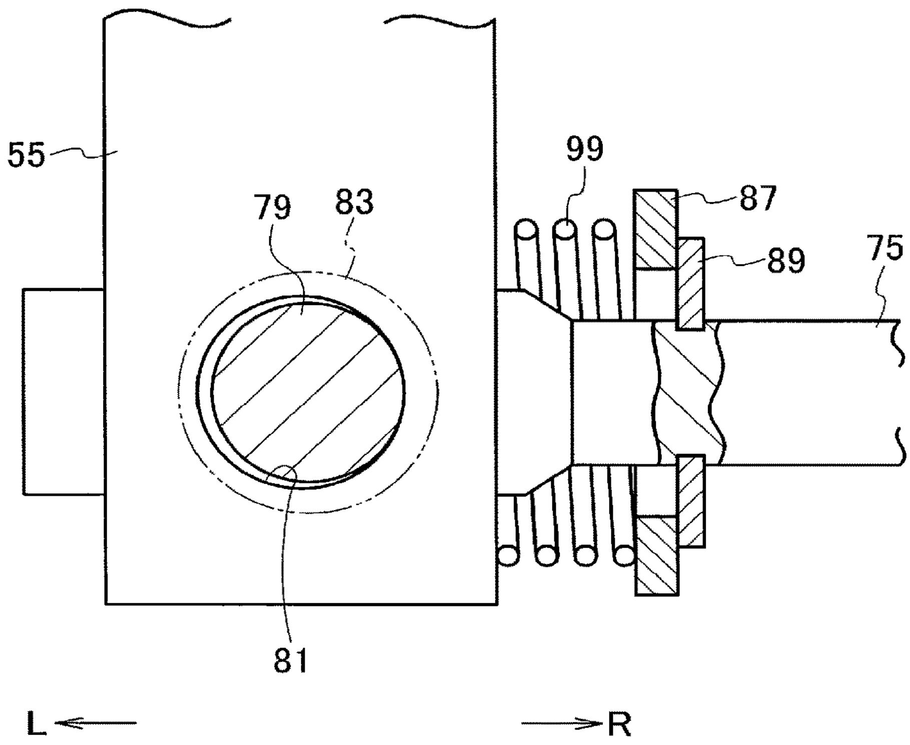
FIG. 6B is a cross-sectional view illustrating a state where a coil spring is provided between the distal end portion of the link member and the distal end portion of the actuating rod.
Figure 7A:
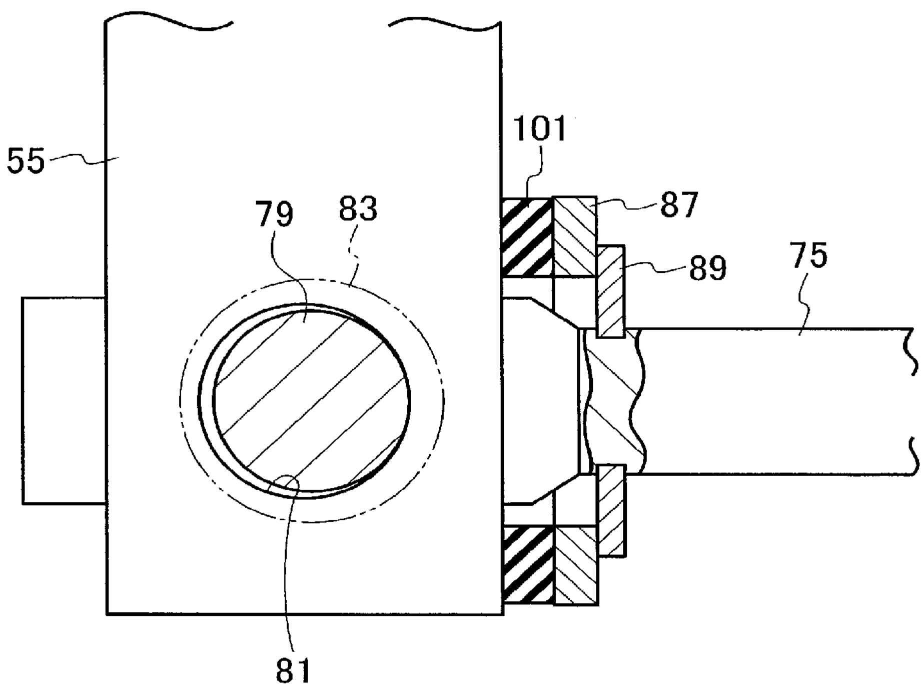
FIG. 7A is a cross-sectional view illustrating a state where a rubber member is provided between the distal end portion of the link member and the distal end portion of the actuating rod.

As illustrated in FIG. 6A, a wave washer 97 made of heat-resistant alloy may be used as the aforementioned biasing member. Alternatively, as illustrated in FIG. 6B, a coil spring 99 made of heat-resistant alloy may be used as the biasing member. Furthermore, as illustrated in FIG. 7A, an annular rubber member 101 may be used as the biasing member. The rubber member 101 is made of heat-resistant rubber such as silicon rubber or chloroprene rubber. In any case, the inner circumferential surface of the pin hole 81 of the link member 55 is locally brought into pressure contact with the outer circumferential surface of the connecting pin 79, by the biasing force (elastic force) of the wave washer 97 or the like.

Figure 7B:
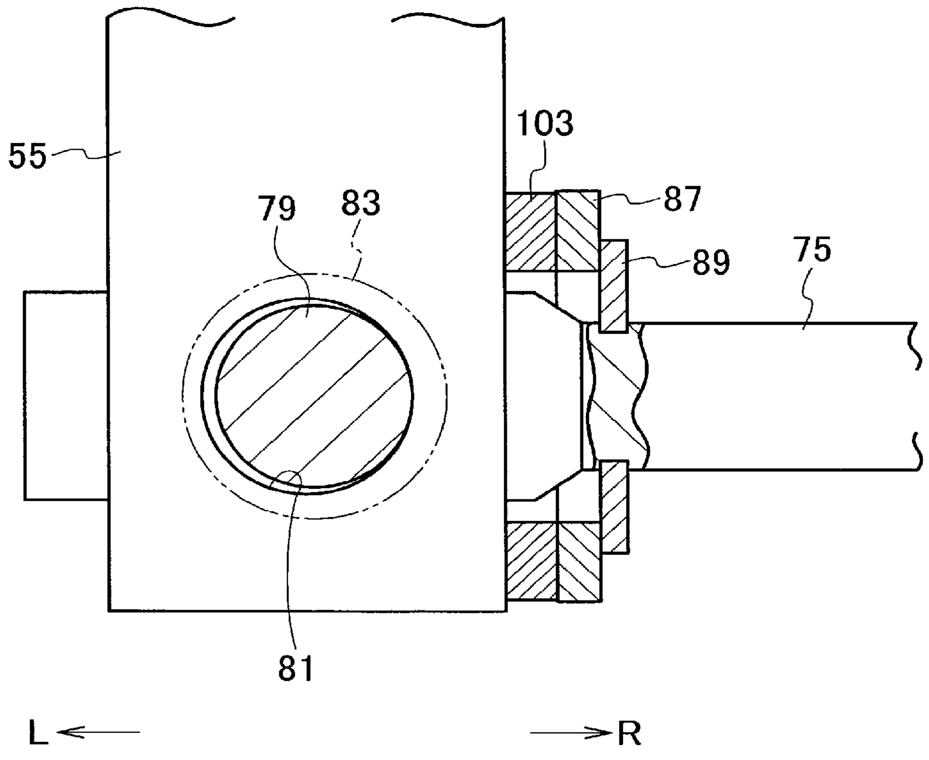
FIG. 7B is a cross-sectional view illustrating a state where a damping alloy member is provided between the distal end portion of the link member and the distal end portion of the actuating rod.

As illustrated in FIG. 7B, an annular damping alloy member 103 may be used as the aforementioned biasing member. The damping alloy member 103 is made of a damping alloy such as an Mg alloy, a Ti—Ni alloy, an Al—Zn alloy, an Mn-Cn alloy, or a Cu—Al—Mn alloy. Note that the damping alloy member 103 may have a hollow structure. In this case, air or oil may be filled inside the damping alloy member 103 or an elastic member such as rubber may be interposed. In any case, the inner circumferential surface of the pin hole 81 of the link member 55 is locally brought into pressure contact with the outer circumferential surface of the connecting pin 79 by the biasing force of the damping alloy member 103.

Figure 8A:
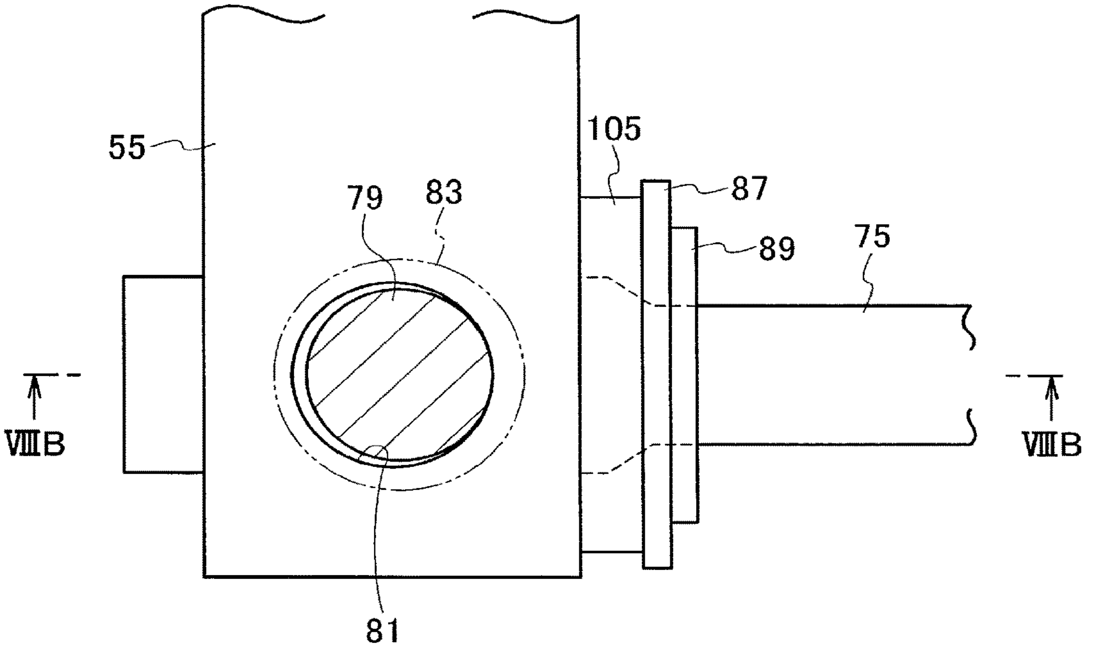
FIG. 8A is a diagram illustrating a state where a spring clip is provided between the distal end portion of the link member and the distal end portion of an actuating rod.
Figure 8B:
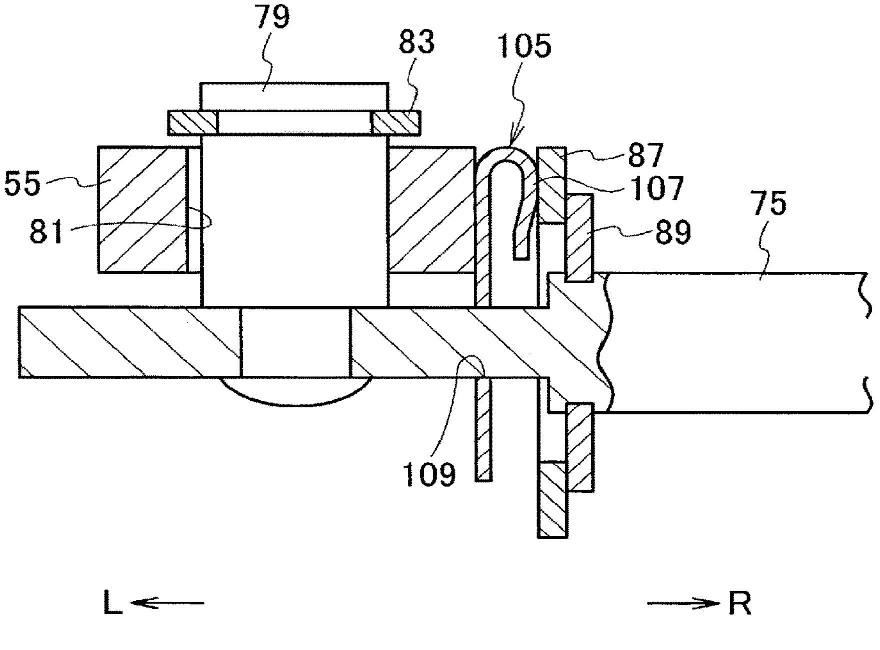
FIG. 8B is a cross-sectional view along VIIIB-VIIIB line in FIG. 8A.
Figure 9:
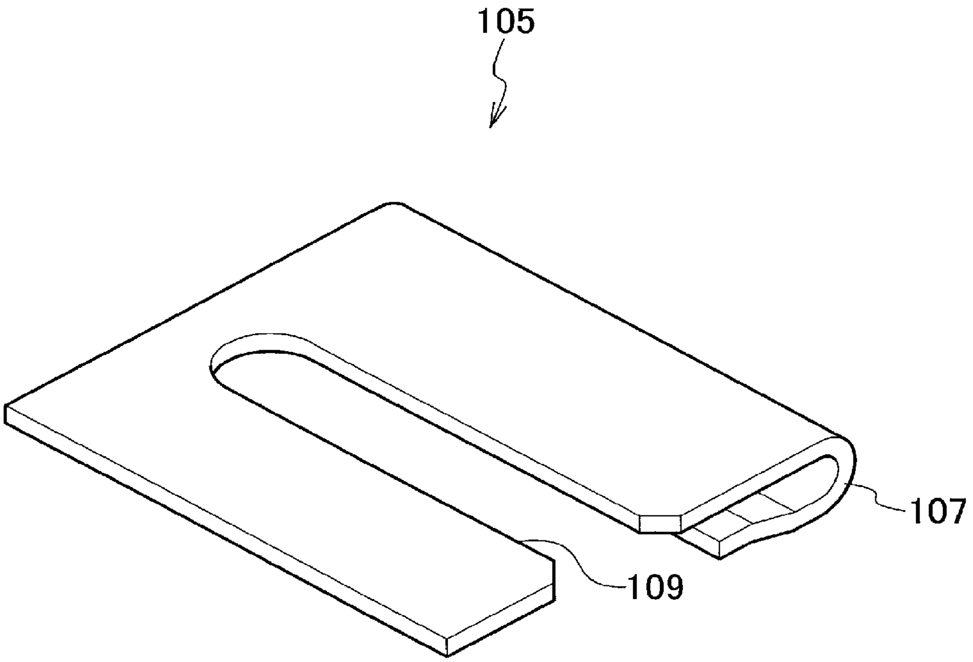
FIG. 9 is a perspective view of a leaf spring illustrated in FIG. 8A and FIG. 8B.

As illustrated in FIG. 8A, FIG. 8B, and FIG. 9, a spring clip 105 may be used as the aforementioned biasing member. The spring clip 105 has a bent portion 107 capable of elastic deformation in the axial direction of the actuating rod 75 on one end side. The bent portion 107 is sandwiched by the link member 55 and the washer 87. Furthermore, a slit (notched portion) 109 to be fitted to the actuating rod 75 is formed at a center of the spring clip 105. Moreover, a projection (not shown) for preventing falling-off is formed on an inlet side of the slit 109. The inner circumferential surface of the pinhole 81 of the link member 55 is locally brought into pressure contact with the outer circumferential surface of the connecting pin 79 by the biasing force (elastic force) of the bent portion 107 of the spring clip 105. Note that an insertion hole (not shown) for allowing insertion of the actuating rod 75 may be formed instead of formation of the slit 109 at the center of the spring clip 105. Meanwhile, in a case where the slit 109 is formed at the center of the spring clip 105, after the distal end portion of the actuating rod 75 and the distal end portion of the link member 55 are connected to each other, the spring clip 105 can be easily assembled between the distal end portion of the link member 55 and the distal end portion of the actuating rod 75, whereby an influence of the waste gate valve 35 on productivity can be made as small as possible.

The biasing member such as the disc spring 85 and the washer 87 may be arranged on the left side of the distal end portion of the link member 55 instead of on the right side of the distal end portion of the link member 55.

Figure 10A:
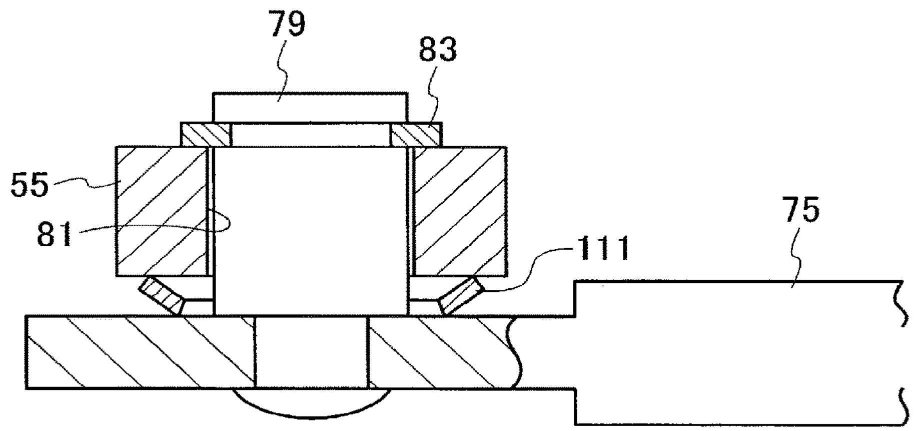
FIG. 10A and FIG. 10B are cross-sectional views illustrating another state where the disc spring is provided between the distal end portion of the link member and the distal end portion of the actuating rod.
Figure 10B:
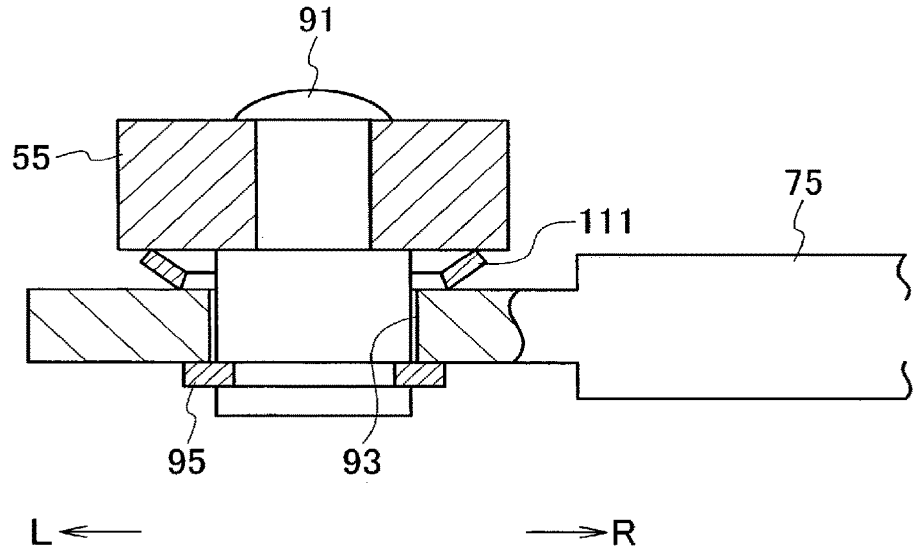

As illustrated in FIG. 10A and FIG. 10B, a disc spring 111 may be used as a biasing member (second biasing member) for biasing the distal end portion of the link member 55 and the distal end portion of the actuating rod 75 in the directions opposite to each other, in the axial direction of the connecting pin 79 (or 91). The disc spring 111 biases the distal end portion of the link member 55 and the distal end portion of the actuating rod 75 in the directions opposite to each other, in the axial direction of the connecting pin 79 (or 91). Note that the aforementioned wave washer, coil spring, annular damping alloy member or spring clip may be used instead of the disc spring 111. In any case, the connecting pin 79 (or 91) is inserted inside the biasing member such as the disc spring 111. Here, as illustrated in FIG. 10A, in a state where the connecting pin 79 is integrally provided at the distal end portion of the actuating rod 75 and the pin hole 81 is penetrated and formed at the distal end portion of the link member 55, the link member 55 is brought into pressure contact with the retainer ring 83, by the biasing force (elastic force) of the biasing member such as the disc spring 111. As illustrated in FIG. 10B, in the state where the connecting pin 91 is integrally provided at the distal end portion of the link member 55 and the pin hole 93 is penetrated and formed at the distal end portion of the actuating rod 75, the actuating rod 75 is pressed into contact with the retainer ring 95, by the biasing force (elastic force) of the biasing member such as the disc spring 111. Note that a biasing direction of the biasing member such as the disc spring 111 is the axial direction of the connecting pin 79 (or 91), but the biasing direction may be inclined to the axial direction of the connecting pin 79 (or 91) within the range where the effect of the present disclosure can be exerted.

Figure 11A:
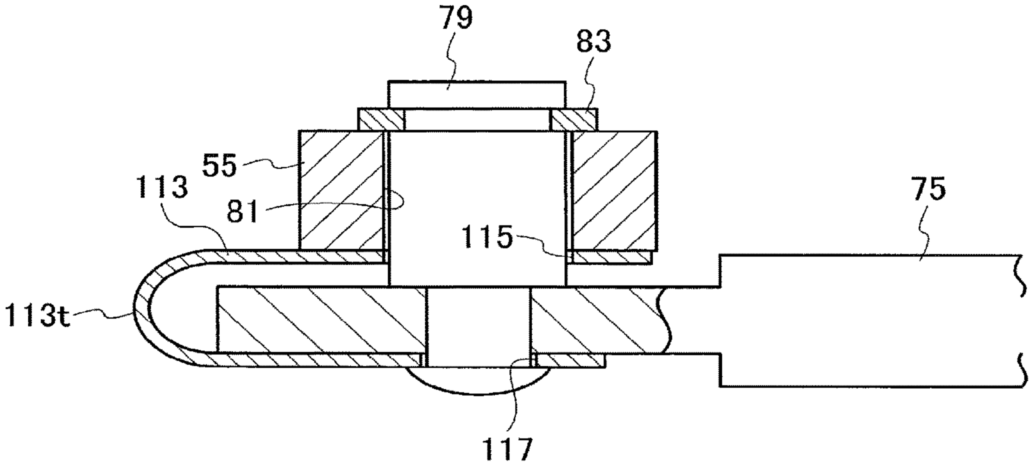
FIG. 11A and FIG. 11B are cross-sectional views illustrating a state where the leaf spring is provided between the distal end portion of the link member and the distal end portion of the actuating rod.
Figure 11B:
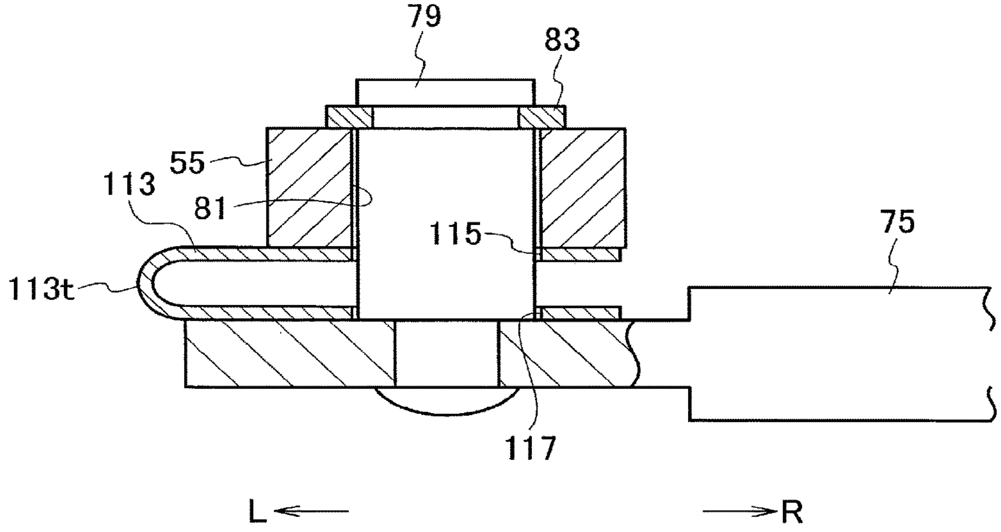

As illustrated in FIG. 11A, a leaf spring 113 may also be used instead of the use of the biasing member such as the disc spring 111. The leaf spring 113 is formed in a belt-like shape, has, for example, a folded back portion 113*t* formed by press-forming in the middle of its longitudinal direction, and has a U-shape on a side view. A first insertion hole 115 for allowing insertion of the connecting pin 79 is penetrated and formed at one end portion of the leaf spring 113. A second insertion hole 117 for allowing insertion of the connecting pin 79 is penetrated and formed at the other end portion of the leaf spring 113. In addition, the one end portion of the leaf spring 113 is brought into pressure contact with the distal end portion of the link member 55 by an elastic force of the leaf spring 113, whereas the other end portion of the leaf spring 113 is fixed to the distal end portion of the actuating rod 75 by swaging or the like of the connecting pin 79. Additionally, as illustrated in FIG. 11B, the other end portion of the leaf spring 113 may be brought into pressure contact with the distal end portion of the actuating rod 75 by the elastic force of the leaf spring 113, instead of fixation of the other end portion of the leaf spring 113 to the distal end portion of the actuating rod 75. Here, the link member 55 is brought into pressure contact with the retainer ring 83 by the biasing force (elastic force) of the leaf spring 113. Note that the leaf spring 113 has a U-shape on a side view, but a shape (including the shape on a side view) of the leaf spring 113 may be changed to an arbitrary shape by, for example, the formation or the like of the folded back portion 113*t* into an overlapping shape, within the scope where the effect of the present disclosure can be exerted, for example. The first notched portion (not shown) having a U-shape for allowing insertion of the connecting pin 79 may be formed instead of penetration and formation of the first insertion hole 115 in the one end portion of the leaf spring 113. A second notched portion (not shown) having a U-shape for allowing insertion of the connecting pin 79 may be formed instead of penetration and formation of the second insertion hole 117 in the other end portion of the leaf spring 113.

Figure 12A:
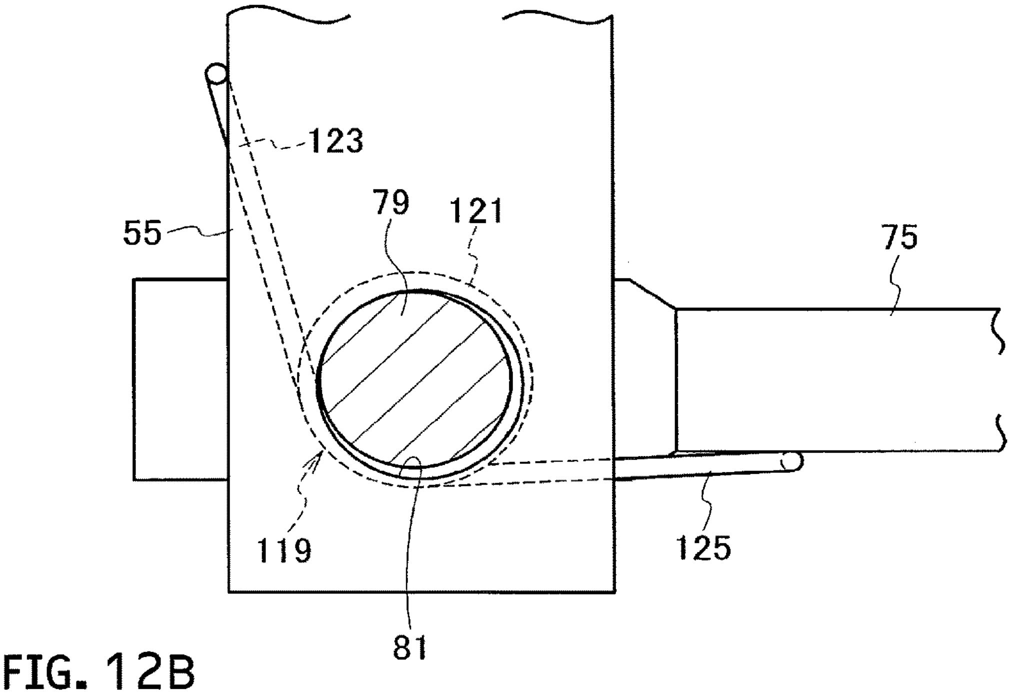
FIG. 12A and FIG. 12B are cross-sectional views illustrating a state where a torsion spring is provided between the distal end portion of the link member and the distal end portion of the actuating rod.
Figure 12B:
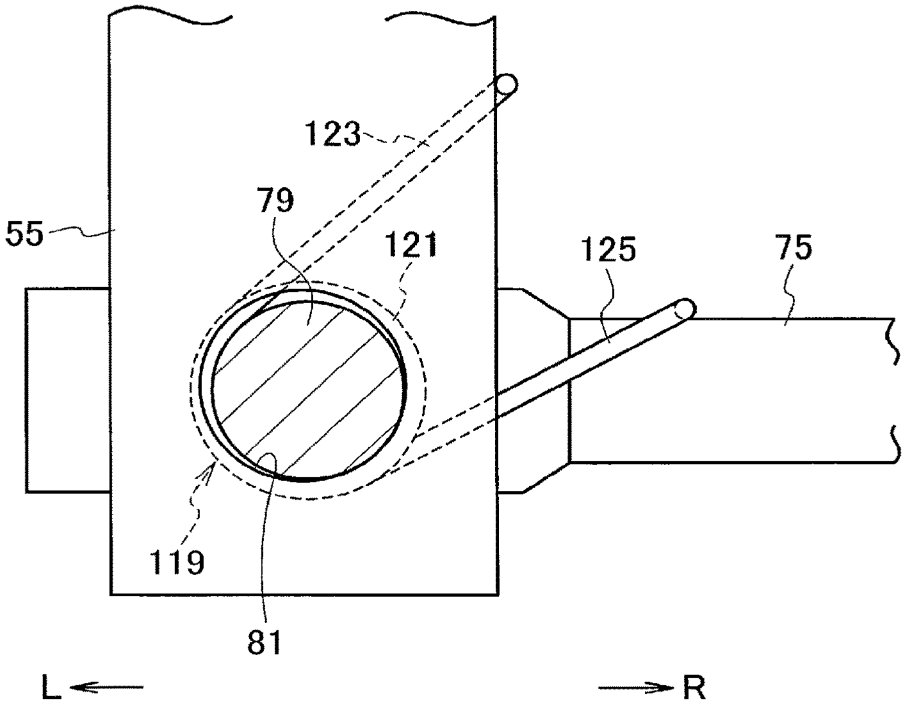

Instead of the use of the biasing member such as the disc spring 85 for biasing the distal end portion of the link member 55 and the distal end portion of the actuating rod 75 in the axial direction of the actuating rod 75 or the like as the directions opposite to each other, as illustrated in FIG. 12A and FIG. 12B, a torsion spring 119 may be used for biasing the distal end portion of the link member 55 and the distal end portion of the actuating rod 75 in a direction approaching to each other or a direction separating from each other. In addition, the torsion spring 119 includes a coil portion 121 disposed on the connecting pin 79, a first arm portion 123 provided on this coil portion 121 so as to protrude and having its distal end portion locked or fixed to a part of the link member 55, and a second arm portion 125 provided on the coil portion 121 so as to protrude and having the distal end portion locked or fixed to a part of the actuating rod 75. Note that FIG. 12A illustrates a state where the distal end portion of the link member 55 and the distal end portion of the actuating rod 75 are biased by the torsion spring 119 in the direction approaching to each other, whereas FIG. 12B illustrates a state where the distal end portion of the link member 55 and the distal end portion of the actuating rod 75 are biased by the torsion spring 119 in the direction separating from each other.

Subsequently, the action and the effect of the embodiment of the present disclosure will be described.

When the exhaust gas introduced through the gas inlet 27 flows from the inlet side to the outlet side of the turbine wheel 25 through the turbine scroll channel 29, a rotary force (rotary torque) is generated by using pressure energy of the exhaust gas, whereby the rotor shaft 9 and the compressor wheel 13 can be rotated integrally with the turbine wheel 25. Accordingly, the air introduced through the air inlet 15 can be compressed and discharged from the air outlet 21 through the diffuser channel 17 and the compressor scroll channel 19, and the air to be supplied to the engine can be turbocharged.

Figure 3:
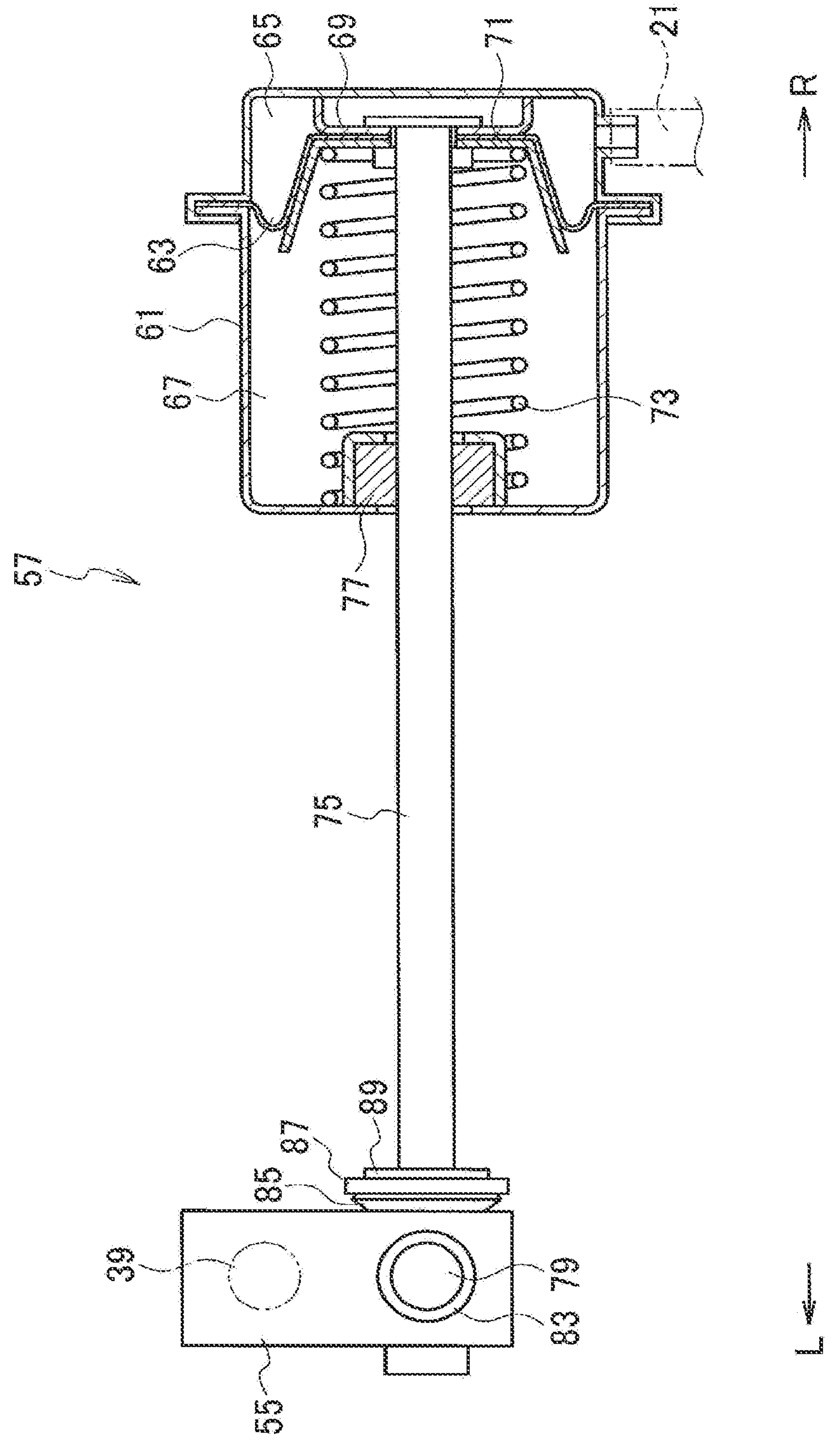
FIG. 3 is a cross-sectional view of a diaphragm actuator.
Figure 4A:
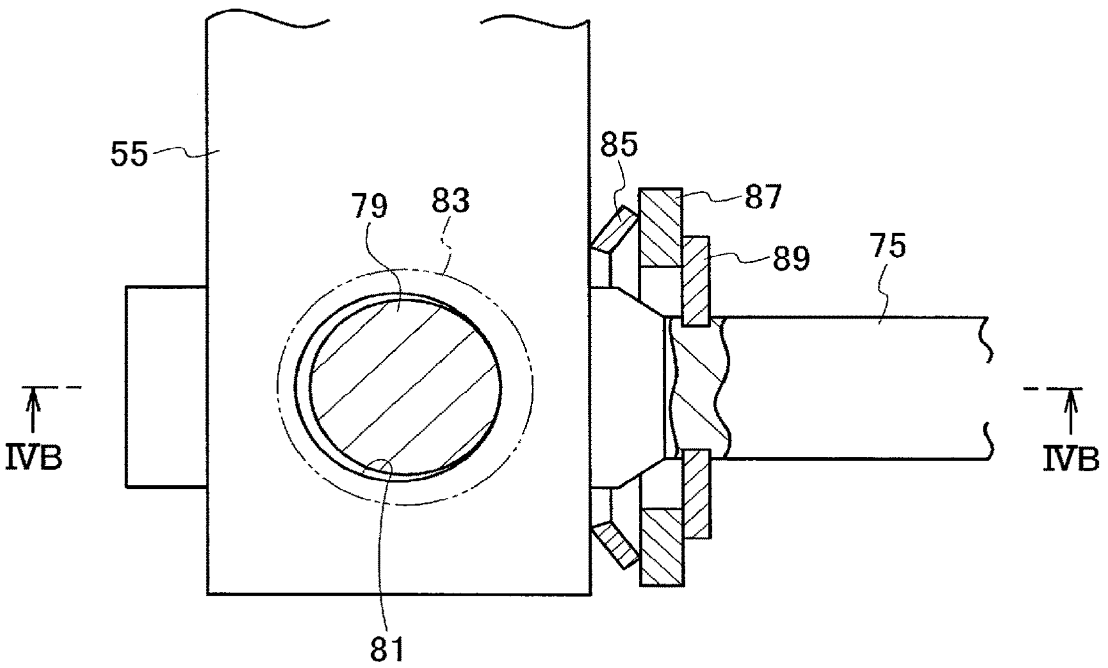
FIG. 4A is a diagram illustrating a state where a disc spring is provided between a distal end portion of the link member and a distal end portion of an actuating rod.
Figure 4B:
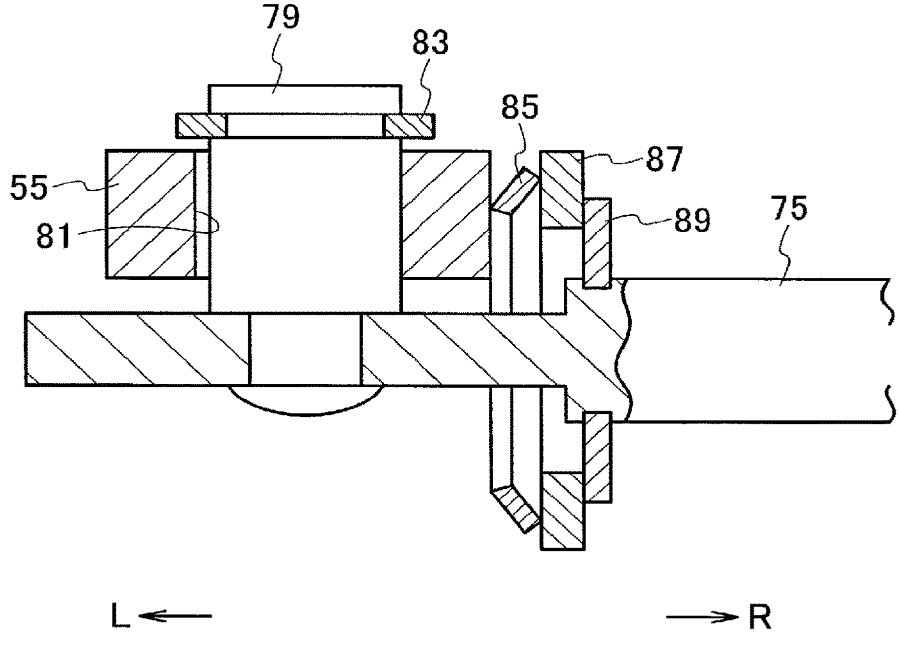
FIG. 4B is a cross-sectional view along IVB-IVB line in FIG. 4A.

During the operation of the turbocharger 1, when a turbocharging pressure (pressure of the air outlet 21) reaches the set pressure, and a positive pressure is applied from the air outlet 21 as a pressure source to the pressure chamber 65, the actuating rod 75 moves to one side (left direction) in the axial direction (axial direction of the actuating rod 75) to thereby swing the link member 55 in the positive direction (clockwise direction in FIG. 1 and FIG. 3). Then, the valve 45 swings to the positive direction (opening direction) via the stem 39 and the mounting member 43 and can open the opening portion of the bypass passage 33. As a result, a part of the exhaust gas introduced through the gas inlet 27 can be made to bypass the turbine wheel 25 to thereby be able to reduce the flow rate of the exhaust gas supplied to the turbine wheel 25 side.

Furthermore, after the opening portion of the bypass passage 33 is opened, when the turbocharging pressure falls to less than the set pressure and the positive-pressure applied state from the air outlet 21 is released, the actuating rod 75 moves to the other side (right direction) in its axial direction by the biasing force of the return spring 73 to thereby swing the link member 55 in the opposite direction (counterclockwise direction in FIG. 1 and FIG. 3). Then, the valve 45 swings to the opposite direction (closing direction) via the stem 39 and the mounting member 43, whereby the opening portion of the bypass passage 33 can be closed. Therefore, the flow of the exhaust gas in the bypass passage 33 can be shut off, and the flow rate of the exhaust gas supplied to the turbine wheel 25 side can be increased.

Since the distal end portion of the link member 55 and the distal end portion of the actuating rod 75 are biased by the biasing member such as the disc spring 85 in the directions opposite to each other, even if pulsation of the exhaust gas (pulsation pressure) from the engine side or pulsation from the diaphragm actuator 57 side or the like is generated, the vibration of the link member 55 and the actuating rod 75 caused by the pulsation or the like can be reduced. In a case where the biasing direction of the biasing member such as the disc spring 85 is the axial direction of the actuating rod 75, the vibration of the link member 55 and the like caused by the pulsation of the exhaust gas from the engine side and the pulsation from the diaphragm actuator 57 side can be effectively suppressed while the biasing force of the biasing member such as the disc spring 85 is made stable by the washer 87. In a case where the biasing direction of the biasing member such as the disc spring 111 is the axial direction of the connecting pin 79 (or 91), the vibration of the link member 55 and the like caused by the pulsation of the exhaust gas from the engine side can be effectively suppressed. Furthermore, the vibration of the valve 45 caused by the pulsation or the like can be also suppressed by suppression of the vibration of the link member 55 and the actuating rod 75.

Therefore, according to the embodiment of the present disclosure, since the vibration of the link member 55 and the actuating rod 75 and the like caused by the pulsation of the exhaust gas from the engine side or the like can be suppressed, the chattering sound (contact sound caused by vibration) from the waste gate valve 35 can be reduced, and quietness of the waste gate valve 35 can be enhanced. In addition, wear of the outer circumferential surface of the connecting pin 79 (or 91) and wear of the inner circumferential surface of the pin hole 81 of the link member 55 (or the pin hole 93 of the actuating rod 75) can be reduced.

Note that the present disclosure is not limited to the aforementioned explanation of the embodiment but can be carried out in various modes as follows.

A waste gate valve (not shown) opening and closing the opening portion of a bypass passage (not shown) formed in the exhaust manifold may be provided at an appropriate position of the exhaust manifold (not shown) connected in a state of communicating with the gas inlet 27 of the turbine housing 23, instead of provision of the waste gate valve 35 opening and closing the bypass passage 33 at an appropriate position of the turbine housing 23.

A negative pressure may be applied from another pressure source (not shown) on the engine side to the pressure chamber 65, instead of application of the positive pressure from the air outlet 21 to the pressure chamber 65. In this case, the return spring 73 is provided in the pressure chamber 65. Furthermore, the actuator body 61 may have another pressure chamber (not shown), on the inside, capable of applying the negative pressure from another pressure source (not shown) such as a negative pressure pump, instead of the atmospheric air chamber 67. An electronically controlled electric actuator (not shown) or a hydraulically driven hydraulic actuator (not shown) may be used instead of the diaphragm actuator. Moreover, at least one of the distal end portion of the link member 55 and the distal end portion of the actuating rod 75 may have a bifurcated shape.

In addition, the scope of the right included in the present disclosure is not limited to the aforementioned embodiment. That is, the variable flow valve mechanism of the present application is not limited to the aforementioned waste gate valve 35 but can also be applied to a switching valve mechanism (not shown) for switching between a supply state and a supply stop state of the exhaust gas with respect to any of a plurality of turbine scroll channels (not shown) formed in the turbine housing (not shown) as illustrated in Japanese Utility Model Application Laid-Open Publication No. 61-33923 and Japanese Patent Application Laid-Open Publication No. 2001-263078, for example. Furthermore, the variable flow valve mechanism of the present application can also be applied to switching valve mechanism (not shown) for switching between the supply state and the supply stop state of the exhaust gas with respect to any stage of a multiple-stage turbine housing (not shown) as illustrated in Japanese Patent Application Laid-Open Publication Nos. 2010-209688 and 2011-106358, for example.

What is claimed is:

1. A variable flow valve mechanism for a turbocharger, comprising:

a stem;

a mounting member integrally connected to the stem;

a valve provided at a distal end portion of the mounting member, configured to open and close an opening portion of a variable gas flow passage for adjusting a flow rate of an exhaust gas from an engine supplied to a turbine wheel in the turbocharger;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a biasing member configured to bias the link member and the actuating rod in directions separating the link member and the actuating rod from each other along the axial direction of the actuator rod.

2. The variable flow valve mechanism according to claim 1, further comprising:

a washer provided at the actuating rod and configured to support the biasing member.

3. The variable flow valve mechanism according to claim 2, wherein the biasing member is a disc spring provided between the link member and the actuating rod.

4. The variable flow valve mechanism according to claim 3, wherein an inner circumferential surface of the pin hole is locally brought into pressure contact with an outer circumferential surface of the connecting pin by the biasing member.

5. The variable flow valve mechanism according to claim 2, wherein an inner circumferential surface of the pin hole is locally brought into pressure contact with an outer circumferential surface of the connecting pin by the biasing member.

6. The variable flow valve mechanism according to claim 1, wherein the biasing member is a disc spring provided between the link member and the actuating rod.

7. The variable flow valve mechanism according to claim 6, wherein an inner circumferential surface of the pin hole is locally brought into pressure contact with an outer circumferential surface of the connecting pin by the biasing member.

8. The variable flow valve mechanism according to claim 1, wherein the biasing member is a torsion spring including: a coil supported by the connecting pin, and arms extending from the coil to between the link member and the actuating rod to separate the link member and the actuating rod from each other.

9. The variable flow valve mechanism according to claim 8, wherein an inner circumferential surface of the pin hole is locally brought into pressure contact with an outer circumferential surface of the connecting pin by the biasing member.

10. The variable flow valve mechanism according to claim 1, wherein an inner circumferential surface of the pin hole is locally brought into pressure contact with an outer circumferential surface of the connecting pin by the biasing member.

11. A variable flow valve mechanism for a turbocharger, comprising:

a stem;

a mounting member integrally connected to the stem;

a valve provided at a distal end portion of the mounting member, configured to open and close an opening portion of a variable gas flow passage for adjusting a flow rate of an exhaust gas supplied from an engine to a turbine wheel in the turbocharger;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a leaf spring configured to bias the link member and the actuating rod in directions separating the link member and the actuating rod from each other along an axial direction of the connecting pin, wherein the leaf spring has a U-shape with a first end portion and a second end portion, the first end portion is provided with any one of a hole and a notch into which the connecting pin is inserted, the second end portion is provided with any one of a hole and a notch into which the connecting pin is inserted, the first end portion is disposed between the link member and the actuating rod, and the second end portion is disposed between the first end portion and the actuating rod or disposed at a position opposite to a position of the first end portion across the actuating rod.

12. A turbocharger comprising:

a variable gas flow passage configured to adjust a flow rate of an exhaust gas supplied from an engine to a turbine wheel in the turbocharger; and a variable flow valve mechanism including:

a stem;

a mounting member integrally connected to the stem;

a valve provided at a distal end portion of the mounting member, configured to open and close an opening portion of the variable gas flow passage;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a biasing member configured to bias the link member and the actuating rod in directions separating the link member and the actuating rod from each other along the axial direction of the actuator rod.

13. A turbocharger comprising:

a variable gas flow passage configured to adjust a flow rate of an exhaust gas supplied from an engine to a turbine wheel in the turbocharger; and a variable flow valve mechanism including:

a stem;

a mounting member integrally connected to the stem;

a valve provided at a distal end portion of the mounting member, configured to open and close an opening portion of the variable gas flow passage;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a leaf spring configured to bias the link member and the actuating rod in directions separating the link member and the actuating rod from each other along an axial direction of the connecting pin, wherein the leaf spring has a U-shape with a first end portion and a second end portion, the first end portion and the second end portion are provided with holes or notches into which the connecting pin is inserted, the first end portion is disposed between the link member and the actuating rod, and the second end portion is disposed between the first end portion and the actuating rod or disposed at a position opposite to a position of the first end portion across the actuating rod.

14. A variable flow valve mechanism for a turbocharger, comprising:

a stem;

a mounting member integrally connected to the stem;

a valve provided at a distal end portion of the mounting member, configured to open and close an opening portion of a variable gas flow passage for adjusting a flow rate of an exhaust gas supplied from an engine to a turbine wheel in the turbocharger;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a torsion spring including: a coil supported by the connecting pin, and arms extending from the coil to positions interposing the link member and the actuating rod to approach the link member and the actuating rod to each other.

15. The variable flow valve mechanism according to claim 14, wherein an inner circumferential surface of the pin hole is locally brought into pressure contact with an outer circumferential surface of the connecting pin by the torsion spring.

16. A turbocharger comprising:

a variable gas flow passage configured to adjust a flow rate of an exhaust gas supplied from an engine to a turbine wheel in the turbocharger; and a variable flow valve mechanism including:

a stem;

a mounting member integrally connected to the stem;

a valve provided at a distal end portion of the mounting member and configured to open and close an opening portion of the variable gas flow passage;

a link member integrally connected to the stem;

an actuating rod movably provided in an axial direction of the actuating rod, and rotatably connected to a distal end portion of the link member;

a pin hole formed at one of the link member and the actuating rod;

a connecting pin provided at the other of the link member and the actuating rod, the connecting pin being inserted into the pin hole; and a torsion spring including: a coil supported by the connecting pin, and arms extending from the coil to positions interposing the link member and the actuating rod to approach the link member and the actuating rod to each other.

* * * * *